(12) United States Patent
Kim et al.

(10) Patent No.: US 9,948,849 B2
(45) Date of Patent: Apr. 17, 2018

(54) IMAGE SIGNAL PROCESSOR AND DEVICES INCLUDING THE SAME

(71) Applicants: Dae Kwan Kim, Suwon-si (KR); Ha Young Ko, Seoul (KR); Chae Sung Kim, Seoul (KR); Dong Ki Min, Seoul (KR)

(72) Inventors: Dae Kwan Kim, Suwon-si (KR); Ha Young Ko, Seoul (KR); Chae Sung Kim, Seoul (KR); Dong Ki Min, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 50 days.

(21) Appl. No.: 15/050,690

(22) Filed: Feb. 23, 2016

(65) Prior Publication Data

US 2016/0277658 A1    Sep. 22, 2016

(30) Foreign Application Priority Data

Mar. 16, 2015    (KR) .......................... 10-2015-0035859

(51) Int. Cl.
*H04N 5/228*    (2006.01)
*H04N 5/232*    (2006.01)
*H04N 5/369*    (2011.01)
*H04N 9/04*    (2006.01)

(52) U.S. Cl.
CPC ..... *H04N 5/23212* (2013.01); *H04N 5/23229* (2013.01); *H04N 5/3696* (2013.01); *H04N 9/045* (2013.01)

(58) Field of Classification Search
None
See application file for complete search history.

(56) References Cited

U.S. PATENT DOCUMENTS

| 6,803,954 | B1 | 10/2004 | Hong et al. |
| 8,041,151 | B2 | 10/2011 | Tanaka et al. |
| 8,081,834 | B2 | 12/2011 | Chou et al. |
| 8,086,058 | B2 | 12/2011 | George et al. |
| 8,213,746 | B2 | 7/2012 | Volovelsky et al. |
| 8,315,476 | B1 | 11/2012 | Georgiev et al. |
| 8,391,637 | B2 | 3/2013 | Kinoshita |
| 8,436,909 | B2 | 5/2013 | Farina et al. |

(Continued)

FOREIGN PATENT DOCUMENTS

JP    2013066146 A    4/2013
JP    2013145979 A    7/2013

*Primary Examiner* — Stephen Coleman
(74) *Attorney, Agent, or Firm* — Harness, Dickey & Pierce, P.L.C.

(57) ABSTRACT

An image signal processor includes a memory configured to store a table, the table including a plurality of point spread functions (PSFs), a PSF selection circuit configured to output at least one of the plurality of PSFs stored in the table based on selection information, a disparity extractor configured to extract a disparity value from image data corresponding to pixel signals output from at least one pixel of a plurality of pixels included in an image sensor, and a processing circuit configured to generate pixel location information for the at least one pixel. Each of the pixels of the plurality of pixels includes a plurality of photoelectric conversion elements. The selection information includes the disparity value and the pixel location information.

20 Claims, 14 Drawing Sheets

(56) References Cited

U.S. PATENT DOCUMENTS

| | | |
|---|---|---|
| 8,553,091 B2 | 10/2013 | Ishii et al. |
| 8,581,992 B2 | 11/2013 | Hamada |
| 8,792,014 B2 | 7/2014 | Watanabe |
| 2005/0117114 A1* | 6/2005 | Jiang .................. G02C 7/024 351/159.77 |
| 2010/0259607 A1* | 10/2010 | Kennedy ............ F41G 7/2253 348/113 |
| 2011/0074968 A1* | 3/2011 | Kim .................... H03K 23/58 348/222.1 |
| 2011/0234610 A1 | 9/2011 | Kim et al. |

* cited by examiner

Disparity :
(1) (DPD1 - DPD2) or (DPD3 - DPD4)
(2) (DPD1 - DPD3) or (DPD2 - DPD4)

(3) $\left( \dfrac{DPD1 + DPD3}{2} - \dfrac{DPD2 + DPD4}{2} \right)$ (4) $\left( \dfrac{DPD1 + DPD2}{2} - \dfrac{DPD3 + DPD4}{2} \right)$ (5) (DPD1 - DPD4) or (DPD2 - DPD3)

Disparity Value = -1

Disparity Value = 0

PSF TABLE

| Pixel Location | Disparity Value | | | | |
|---|---|---|---|---|---|
| | ••• | -1 | 0 | 1 | ••• |
| (1,1) | ••• | PSF1 | PSF5 | ••• | ••• |
| (1,2) | ••• | PSF2 | PSF6 | ••• | ••• |
| (2,1) | ••• | PSF3 | PSF7 | ••• | ••• |
| Center | ••• | PSF4 | PSF8 | ••• | ••• |
| ••• | ••• | ••• | ••• | ••• | ••• |

PSF TABLE

| Pixel Location | ... | Disparity Value @ Lens Position1 (LEP1) | | | | ... | Disparity Value @ Lens Position2 (LEP2) | | | | ... |
|---|---|---|---|---|---|---|---|---|---|---|---|
| | | -1 | 0 | 1 | ... | | -1 | 0 | 1 | ... | |
| (1,1) | ... | L1PSF1 | L1PSF5 | L1PSF9 | ... | ... | L2PSF1 | L2PSF5 | L2PSF9 | ... | ... |
| (1,2) | ... | L1PSF2 | L1PSF6 | L1PSF10 | ... | ... | L2PSF2 | L2PSF6 | L2PSF10 | ... | ... |
| (2,1) | ... | L1PSF3 | L1PSF7 | L1PSF11 | ... | ... | L2PSF3 | L2PSF7 | L2PSF11 | ... | ... |
| Center | ... | L1PSF4 | L1PSF8 | L1PSF12 | ... | ... | L2PSF4 | L2PSF8 | L2PSF12 | ... | ... |
| ... | ... | ... | ... | ... | ... | ... | ... | ... | ... | ... | ... |

FIG. 12

PSF TABLE

| Pixel Location | ... | Disparity Value @ Color Information1 | | | | ... | Disparity Value @ Color Information2 | | | | ... |
|---|---|---|---|---|---|---|---|---|---|---|---|
| | | -1 | 0 | 1 | ... | | -1 | 0 | 1 | ... | |
| (1,1) | ... | C1PSF1 | C1PSF5 | C1PSF9 | ... | ... | C2PSF1 | C2PSF5 | C2PSF9 | ... | ... |
| (1,2) | ... | C1PSF2 | C1PSF6 | C1PSF10 | ... | ... | C2PSF2 | C2PSF6 | C2PSF10 | ... | ... |
| (2,1) | ... | C1PSF3 | C1PSF7 | C1PSF11 | ... | ... | C2PSF3 | C2PSF7 | C2PSF11 | ... | ... |
| Center | ... | C1PSF4 | C1PSF8 | C1PSF12 | ... | ... | C2PSF4 | C2PSF8 | C2PSF12 | ... | ... |
| ... | ... | ... | ... | ... | ... | ... | ... | ... | ... | ... | ... |

IMAGE SIGNAL PROCESSOR AND DEVICES INCLUDING THE SAME

CROSS-REFERENCE TO RELATED APPLICATION

This application claims priority under 35 U.S.C. § 119(a) from Korean Patent Application No. 10-2015-0035859 filed on Mar. 16, 2015 in the Korean Intellectual Property Office (KIPO), the disclosure of which is hereby incorporated by reference in its entirety.

BACKGROUND

Various example embodiments of the inventive concepts relate to an image signal processor, and more particularly, to an image signal processor for selecting at least one function from among point spread functions (PSFs) included in a table using selection information and for generating output image data having a higher resolution than image data using the selected PSF and the image data and to devices including the same.

In photography, PAF stands for phase-detection auto focus or phase-difference auto focus. Dynamic range refers to the range between the maximum and minimum measurable light intensities of an image sensor. The varying degrees of measurable light intensity depends upon the light capture device used, which determines the overall performance of the dynamic range of an imaging sensor.

Wide dynamic range (WDR) technology increases the dynamic range of an imaging sensor by physically increasing the pixel performance, or digitally applying multiple exposure times for each pixel. An ideal WDR sensor has a high full-well capacity (FWC). FWC is defined as the maximum number of electrons corresponding to an incident signal that can be collected by an image sensor without saturation during readout. The higher the FWC, the greater the dynamic range of an image sensor.

In order to reduce the physical space occupied by a phase-difference auto focus module in a digital single-lens reflex (DSLR) camera, the camera sensor of the DSLR camera includes pixels that can directly detect a phase difference. As a result, DSLR cameras can perform auto focus. Such technology is also applied to mirrorless DSLR.

In conventional pixels that detect a phase difference, a photodiode is partially shielded by a metal or the like and only light coming through an unshielded portion of the photodiode is detected. Using the conventional method of detecting a phase difference using a shielded pixel and an unshielded pixel, i.e., using two pixels, causes a problem in that the quality of color images deteriorates due to the two irregularly operating pixels.

SUMMARY

According to some example embodiments of the inventive concepts, there is provided an image signal processor including a memory configured to store a table, the table including a plurality of point spread functions (PSFs), a PSF selection circuit configured to output at least one of the plurality of PSFs stored in the table based on selection information, a disparity extractor configured to extract a disparity value from image data corresponding to pixel signals output from at least one pixel of a plurality of pixels included in an image sensor, each of the pixels of the image sensor including a plurality of photoelectric conversion elements, and a processing circuit configured to generate pixel location information for the at least one pixel. The selection information may include the disparity value and the pixel location information.

The image data may include long-exposure image data corresponding to a first pixel signal output from at least one first photoelectric conversion element among the plurality of photoelectric conversion elements and short-exposure image data corresponding to a second pixel signal output from at least one second photoelectric conversion element among the plurality of photoelectric conversion elements.

The image signal processor may further include a deconvolution circuit configured to generate output image data having a higher resolution than the image data using the at least one PSF output by the PSF selection circuit and the image data.

The image signal processor and the image sensor may be included in an imaging device.

The deconvolution circuit may generate output image data having a higher resolution than the image data using the at least one PSF output by the PSF selection circuit and the image data.

The processing circuit may extract color information from the image data. The selection information may include the extracted color information.

The color information may include at least one signal among a red signal, a green signal, a blue signal, a yellow signal, a cyan signal, a magenta signal, a white signal, and an infrared signal.

The image signal processor may further include a lens position information calculator configured to calculate a position of a lens included in an imaging device, which includes the image sensor, and generate lens position information; and a deconvolution circuit configured to generate output image data having a higher resolution than the image data using the at least one PSF output by the PSF selection circuit and the image data, and the selection information further includes the lens position information.

According to another example embodiment of the inventive concepts, there is provided an application processor including an image signal processor and a multimedia processing circuit connected to the image signal processor. The image signal processor may include a memory configured to store a table including a plurality of point spread functions (PSFs), a PSF selection circuit configured to output at least one of the plurality of PSFs stored in the table based on selection information, a disparity extractor configured to extract a disparity value from image data corresponding to pixel signals output from at least one pixel of a plurality of pixels included in an image sensor, each of the pixels of the image sensor including a plurality of photoelectric conversion elements, and a processing circuit configured to generate pixel location information for the at least one pixel. The selection information includes the disparity value and the pixel location information.

The image data may include long-exposure image data corresponding to a first pixel signal output from at least one first photoelectric conversion element among the plurality of photoelectric conversion elements, and short-exposure image data corresponding to a second pixel signal output from at least one second photoelectric conversion element among the plurality of photoelectric conversion elements.

The image signal processor may include a deconvolution circuit configured to generate output image data having a higher resolution than the image data using the at least one PSF output by the PSF selection circuit and the image data.

The image signal processor and the image sensor may be included in an imaging device.

The image signal processor may further include a deconvolution circuit configured to generate output image data having a higher resolution than the image data using the at least one PSF output by the PSF selection circuit and the image data, the processing circuit is configured to extract color information from the image data, and the selection information further includes the extracted color information.

The color information may include at least one signal among a red signal, a green signal, a blue signal, a yellow signal, a cyan signal, a magenta signal, a white signal, and an infrared signal.

The image signal processor may further include a lens position information calculator configured to calculate a position of a lens included in an imaging device and generate lens position information, the imaging device including the image sensor, a deconvolution circuit configured to generate output image data having a higher resolution than the image data using the at least one PSF output by the PSF selection circuit and the image data, and the selection information may further include the lens position information.

According to further example embodiments of the inventive concepts, there is provided a data processing system including an image sensor configured to generate image data, the image sensor including a plurality of pixels, each of the pixels including a plurality of photoelectric conversion elements, an image signal processor connected to the image sensor, and an application processor connected to the image signal processor. The image signal processor may include a memory configured to store a table including a plurality of point spread functions (PSFs), a PSF selection circuit configured to output at least one of the plurality of PSFs stored in the table based on selection information, a disparity extractor configured to extract a disparity value from the image data corresponding to pixel signals output from at least one pixel of the plurality of pixels, and a processing circuit configured to generate pixel location information for the at least one pixel of the plurality of pixels. The selection information may include the disparity and the pixel location information.

When the image sensor is implemented in a first semiconductor chip and the image signal processor is implemented in a second semiconductor chip, the first semiconductor chip and the second semiconductor chip may be included in an imaging device. The image signal processor may be formed within the application processor.

The image sensor may further include a plurality of microlenses. Each of the plurality of microlenses may be respectively formed on the plurality of pixels. At least one first isolation material may be disposed among the pixels and at least one second isolation materials may be disposed among the photoelectric conversion elements.

The data processing system may include a deconvolution circuit configured to generate output image data having a higher resolution than the image data using the at least one PSF output by the PSF selection circuit and the image data.

The data processing system may be a digital signal lens reflex (DSLR) camera, a smart phone, a tablet device, a wearable device, a laptop computer, an Internet of Things (IoT) device, and an Internet of Everything (IoE) device.

The image signal processor may further include a deconvolution circuit configured to generate output image data having a higher resolution than the image data using the at least one PSF output by the PSF selection circuit and the image data, the processing circuit is configured to extract color information from the image data, and the selection information further includes the extracted color information.

The image signal processor may further include a lens position information calculator configured to calculate a position of a lens included in an imaging device and generate lens position information, the imaging device including the image sensor, a deconvolution circuit configured to generate output image data having a higher resolution than the image data using the at least one PSF output by the PST selection circuit and the image data, and the selection information further includes the lens position information.

According to further example embodiments of the inventive concepts, there is provided an image processing system that may include an image sensor configured to generate first image data, the image sensor including a plurality of pixels and a lens, and each of the pixels including a plurality of photoelectric conversion elements, and at least one image signal processor configured to receive the first image data and generate an output image data by estimating original image data based on the first image data, the output image data having a higher resolution than the first image data.

The at least one image signal processor may perform on the first image data at least one of auto dark level compensation, bad pixel replacement, noise reduction, lens shading compensation, color correction, RGB gamma correction, edge enhancement, hue control, and color suppression, and generate a second image data based on the results of the processing.

The estimating may further include processing the first image data or second image data to compensate for optical blur, downsampling, and noise.

The at least one image signal processor may calculate at least two of a disparity value, pixel location information, lens position information, and color information of the first image data, select at least one point spread function (PSF) based on the calculation result, and apply the selected at least one PSF to the first image in order to compensate for the optical blur, the downsampling, and the noise.

The image sensor may include a plurality of microlenses, each of the plurality of microlenses respectively formed on the plurality of pixels, at least one first isolation material is disposed among the plurality of pixels, and at least one second isolation material is disposed among the plurality of photoelectric conversion elements.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 12 is a diagram of PSFs stored in a PSF table illustrated in FIG. 11 according to further example embodiments of the inventive concepts;

DETAILED DESCRIPTION

Figure 1A:
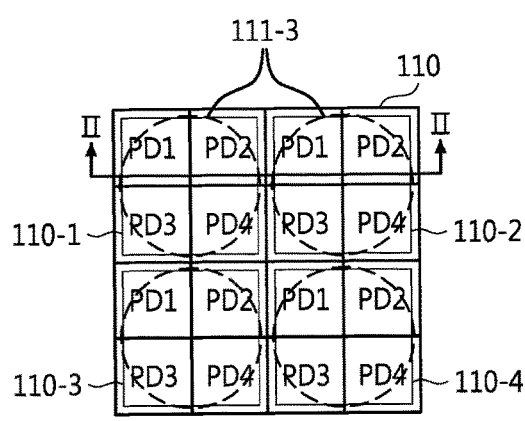
FIGS. 1A and 1B are diagrams of a pixel array including pixels each including photoelectric conversion elements according to some example embodiments of the inventive concepts.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

A point spread function (PSF) describes the response of an image system to a point source and/or a point object. A more general term for the PSF is a system's impulse response or the impulse response of a focused optical system.

Figure 1B:
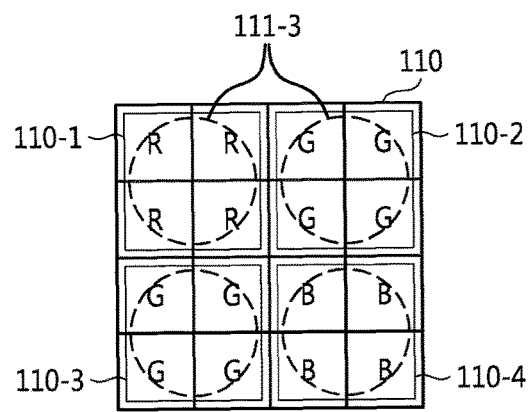

FIGS. 1A and 1B are diagrams of a pixel array 110 including pixels each including photoelectric conversion elements according to some example embodiments. The pixel array 110 may include a plurality of pixels 110-1 through 110-4. The pixels 110-1 through 110-4 may be arranged in a Bayer pattern, but the inventive concepts are not restricted to this example embodiment. The pixels 110-1 through 110-4 may include a Bayer pattern color filter array. Each of the pixels 110-1 through 110-4 may be a red pixel, a green pixel, a blue pixel, an infrared pixel, a yellow pixel, a cyan pixel, a magenta pixel, a white pixel, etc., but are not restricted thereto.

The first pixel 110-1, which for example may output red signals, may include a plurality of photoelectric conversion elements PD1 through PD4. The second pixel 110-2, which for example may output green signals, may include a plurality of photoelectric conversion elements PD1 through PD4. The third pixel 110-3, which for example may output green signals, may include a plurality of photoelectric conversion elements PD1 through PD4. The fourth pixel 110-4, which for example may output blue signals, may include a plurality of photoelectric conversion elements PD1 through PD4. The first pixel 110-1 may be a red pixel, the second pixel 110-2 may be a green pixel, the third pixel 110-3 may be a green pixel, and the fourth pixel 110-4 may be a blue pixel according to some example embodiments.

In other words, each of the pixels R, G, and B includes four photoelectric conversion elements PD1 through PD4. Although each of the pixels R, G, and B includes four photoelectric conversion elements PD1 through PD4 in the example embodiments illustrated in FIGS. 1A and 1B, the example embodiments are not limited thereto and each of the pixels R, G, and B may include two or more photoelectric conversion elements.

At least one of the first photoelectric conversion elements among the four photoelectric conversion elements PD1 through PD4 may output long-exposure pixel signals and at least one of the second photoelectric conversion elements among the four photoelectric conversion elements PD1 through PD4 may output short-exposure pixel signals. Among the four photoelectric conversion elements PD1 through PD4 included in each of the pixels R, G, and B, two elements may output long-exposure pixel signals and the other two elements may output short-exposure pixel signals. Photoelectric conversion elements that have output long-exposure pixel signals may be used as photoelectric conversion elements that output short-exposure pixel signals, or vice versa, depending on how the exposure time is adjusted.

Additionally, among the four photoelectric conversion elements PD1 through PD4 included in each of the pixels R, G, and B; three elements may output long-exposure pixel signals and the fourth element may output short-exposure pixel signals. In other words, the number of photoelectric conversion elements that output long-exposure pixel signals may be the same as or different from the number of photoelectric conversion elements that output short-exposure pixel signals in each pixel.

Figure 6:
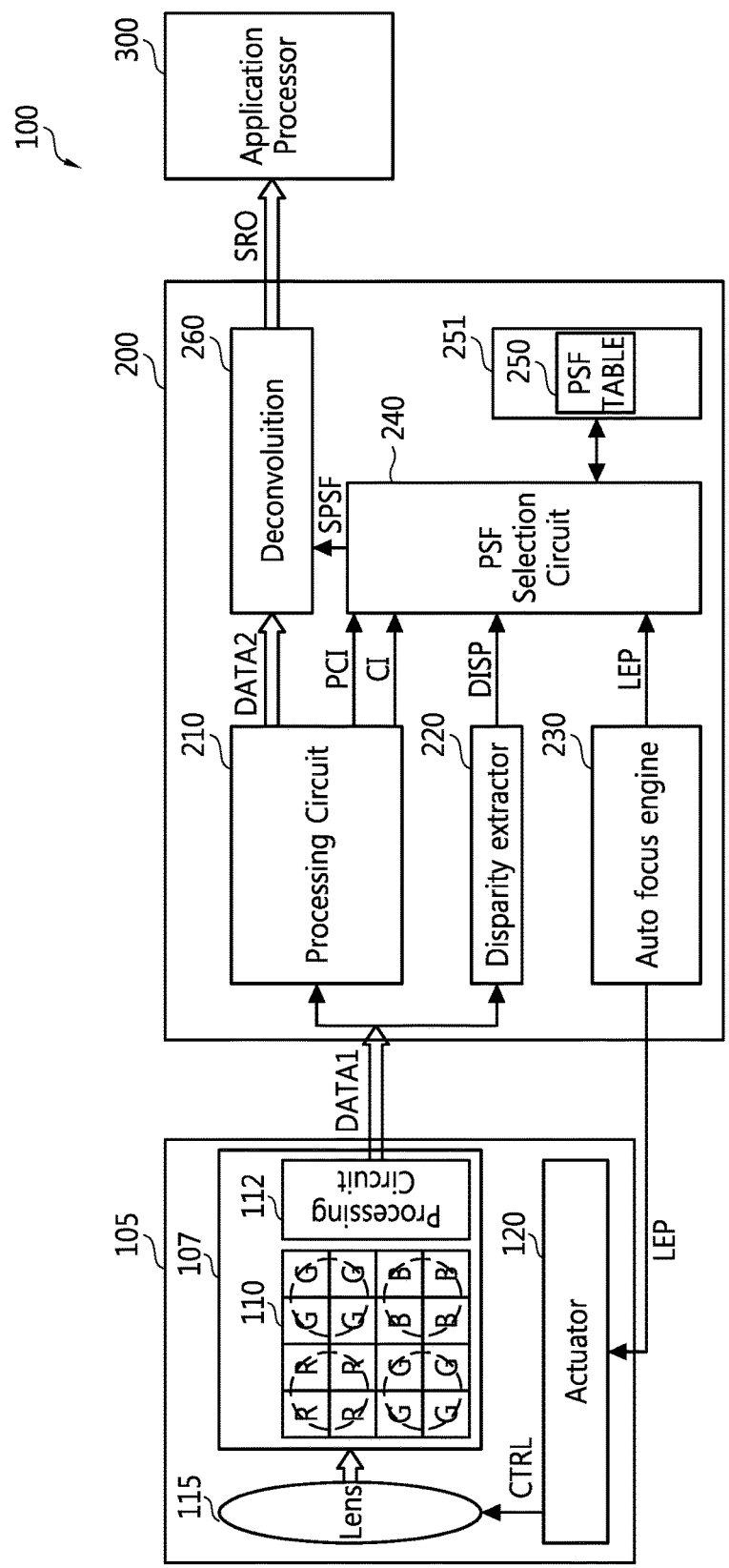
FIG. 6 is a block diagram of a data processing system according to some example embodiments of the inventive concepts.

A row driver included in a processing circuit 112 as illustrated in FIG. 6, according to at least one example embodiment, may independently control the exposure time of the four photoelectric conversion elements PD1 through PD4 included in each of the pixels R, G, and B. Here, the exposure time may be an integration time during which photocharges are collected or generated. The exposure time may be determined by a control signal applied to a gate or gate electrode of a transfer transistor connected to a photoelectric conversion element.

Each of the photoelectric conversion elements PD1 through PD4 may generate photocharges in response to incident light and may be implemented as a photodiode, a photo transistor, a photogate, a pinned photodiode, etc. The photodiode may be an organic photodiode.

Figure 2A:
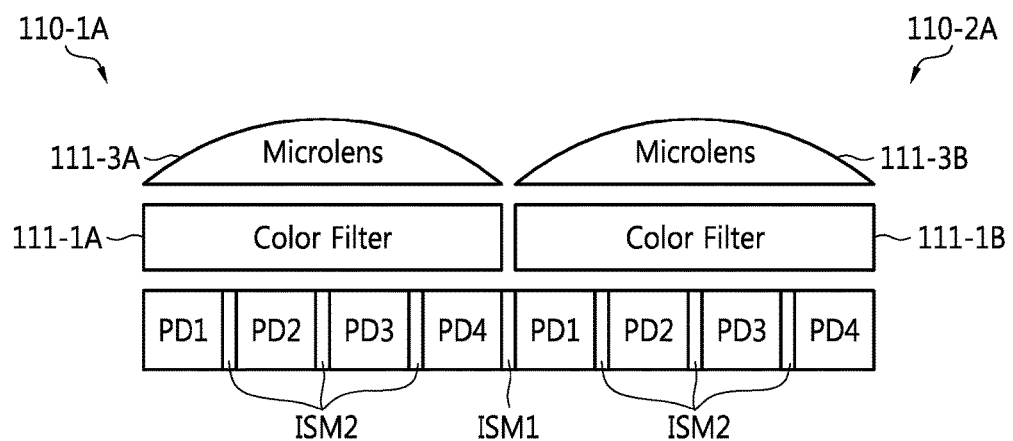
FIGS. 2A and 2B are cross-sectional views of pixels, take along the line II-II illustrated in FIG. 1, according to some example embodiments of the inventive concepts.
Figure 2B:
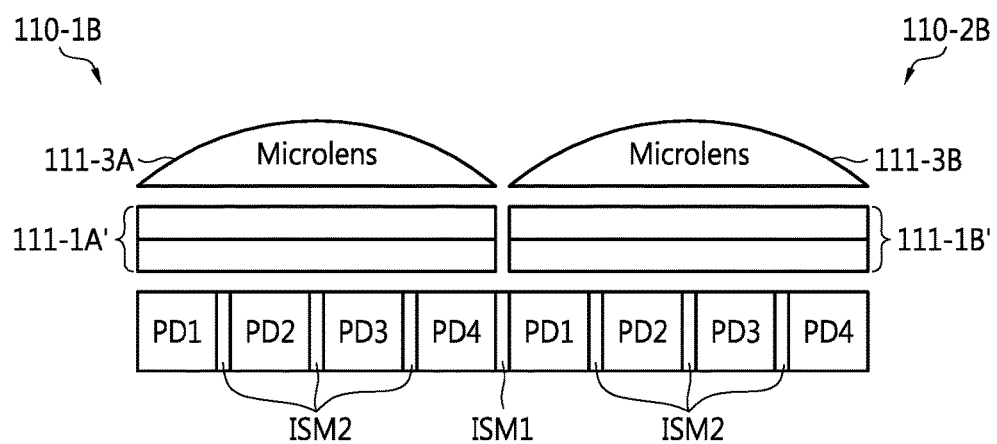

FIGS. 2A and 2B are cross-sectional views of pixels, taken along the line illustrated in FIG. 1, according to some example embodiments of the inventive concepts. Referring to FIGS. 1A, 1B, and 2A, a first pixel 110-1A may include four photodiodes PD1 through PD4, a color filter 111-1A placed (or formed) on the four photodiodes PD1 through PD4, and a microlens 111-3A placed (or formed) on the color filter 111-1A. When the first pixel 110-1A is the first pixel 110-1, the color filter 111-1A may be a red filter, according to at least one example embodiment.

A second pixel 110-2A may include four photodiodes PD1 through PD4, a color filter 111-1B placed (or formed) on the four photodiodes PD1 through PD4, and a microlens 111-3B placed (or formed) on the color filter 111-1B. When the second pixel 110-2A is the second pixel 110-2, the color filter 111-1B may be a green filter, according to at least one example embodiment. The color filters 111-1A and 111-1B may be formed in a single layer.

It will be understood that when a second material is referred to as being placed "on" a first material, the second material can be in direct contact with the first material, or one or more third material(s) may also be present between the first and second materials hereinafter.

A first isolation material ISM1 may be placed between the first pixel 110-1A and the second pixel 110-2A. A second isolation material ISM2 may be placed among the four photodiodes PD1 through PD4 in each pixel 110-1A or 110-2A. In other words, the first isolation material ISM1 may be present among the pixels 110-1 through 110-4 illustrated in FIG. 1A. The first isolation material ISM1 and the second isolation material ISM2 may be the same as or different from each other.

The first and second isolation materials ISM1 and ISM2 may be formed in a process of manufacturing a backside-illuminated (BSI) complementary metal-oxide-semiconductor (CMOS) image sensor or frontside-illuminated (FSI) CMOS image sensor. The first and second isolation materials ISM1 and ISM2 may be formed using deep trench isolation (DTI), but the inventive concepts are not restricted to the current example embodiments.

Referring to FIGS. 1A, 1B, and 2B, a first pixel 110-1B may include four photodiodes PD1 through PD4, a color filter 111-1A' placed (or formed) on the four photodiodes PD1 through PD4, and the microlens 111-3A placed (or formed) on the color filter 111-1A'. The color filter 111-1A' may include a plurality of color filter layers (or films). The color filter layers may have different filtering characteristics. In other words, wavelengths transmitted by the respective color filter layers may be different from each other.

Although the first pixel 110-1 is illustrated as the red pixel R in FIG. 1B, the first pixel 110-1B illustrated in FIG. 2B may be a yellow pixel, a cyan pixel, a magenta pixel, a white pixel, a green pixel, a blue pixel, an infrared pixel, etc., but the inventive concepts are not restricted to these example embodiments.

A second pixel 110-2B may include four photodiodes PD1 through PD4, a color filter 111-1B' placed (or formed) on the four photodiodes PD1 through PD4, and the microlens 111-3B placed (or formed) on the color filter 111-1B'. The color filter 111-1B' may include a plurality of color filter layers (or films). The color filter layers may have different filtering characteristics. In other words, wavelengths transmitted by the respective color filter layers may be different from each other.

Although the second pixel 110-2 is illustrated as the green pixel G in FIG. 1B, the second pixel 110-2B illustrated in FIG. 2B may be a yellow pixel, a cyan pixel, a magenta pixel, a white pixel, a red pixel, a blue pixel, an infrared pixel, etc., but the inventive concepts are not restricted to these example embodiments. Although the color filters 111-1A' and 111-1B' include two color filter layers in the example embodiments illustrated in FIG. 2B, the color filters 111-1A' and 111-1B' may include three color filter layers or more in other example embodiments.

The first isolation material ISM1 may be placed between the first pixel 110-1B and the second pixel 110-2B. The second isolation material ISM2 may be placed among the four photodiodes PD1 through PD4 in each pixel 110-1B or 110-2B. In other words, the first isolation material ISM1 may be placed among the pixels 110-1 through 110-4 illustrated in FIG. 1A. The first isolation material ISM1 and the second isolation material ISM2 may be the same, or different, from each other.

The first and second isolation materials ISM1 and ISM2 may be formed in a process for manufacturing a BSI CMOS image sensor, a FSI CMOS image sensor, and/or other type of image sensor. The first and second isolation materials ISM1 and ISM2 may be formed using DTI, but the inventive concepts are not restricted to the current example embodiments.

Figure 3A:
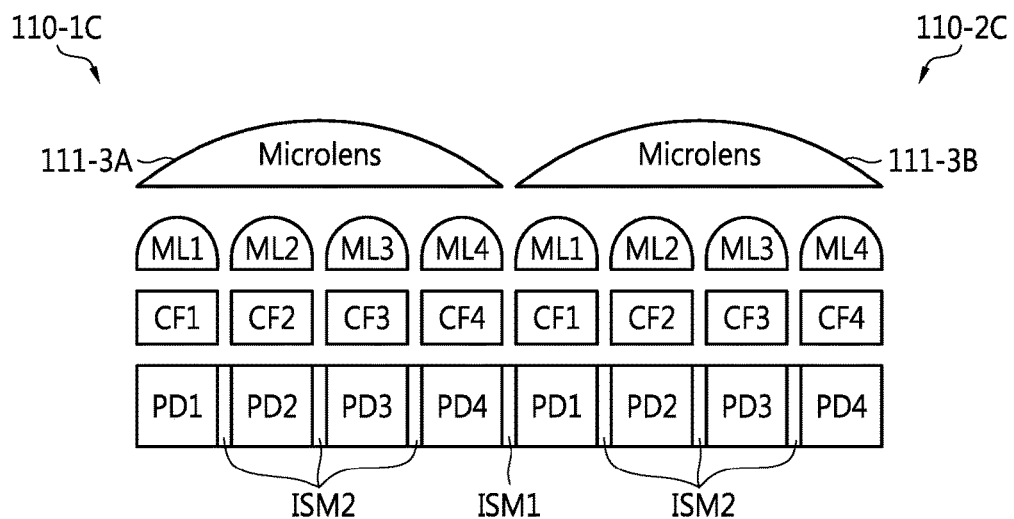
FIGS. 3A and 3B are cross-sectional views of pixels, take along the line II-II illustrated in FIG. 1, according to other example embodiments of the inventive concepts.
Figure 3B:
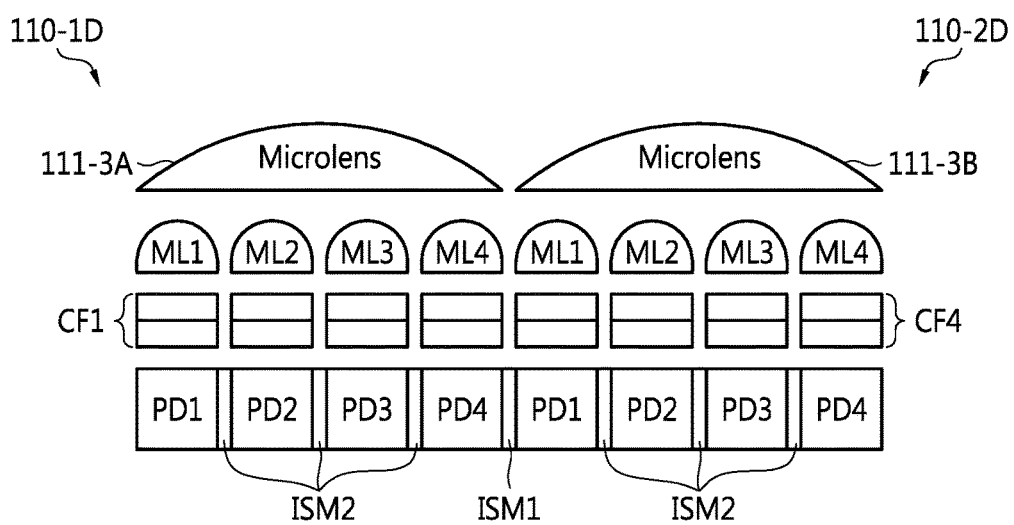

FIGS. 3A and 3B are cross-sectional views of pixels taken along the line II-II illustrated in FIG. 1, according to some example embodiments of the inventive concepts. Referring to FIGS. 1A, 1B, and 3A, a first pixel 110-1C may include four photodiodes PD1 through PD4, color filters CF1 through CF4 respectively placed on the four photodiodes PD1 through PD4, microlenses ML1 through ML4 respectively placed on the color filters CF1 through CF4, and the microlens 111-3A placed on the microlenses ML1 through ML4. When the first pixel 110-1C is the first pixel 110-1, the color filters CF1 through CF4 may be red filters according to at least one example embodiment. In other example embodiments, the color filters CT1 through CF4 may be different color filters.

A second pixel 110-2C may include four photodiodes PD1 through PD4, the color filters CF1 through CF4 respectively placed on the four photodiodes PD1 through PD4, the microlenses ML1 through ML4 respectively placed on the color filters CF1 through CF4, and the microlens 111-3B placed on the microlenses ML1 through ML4. When the second pixel 110-2C is the first pixel 110-2, the color filters CF1 through CF4 may be green filters according to at least one example embodiment. In other example embodiments, the color filters CF1 through CF4 may be different color filters.

The first isolation material ISM1 may be placed between the first pixel 110-1C and the second pixel 110-2C. The second isolation material ISM2 may be placed among the four photodiodes PD1 through PD4 in each pixel 110-1C or 110-2C. In other words, the first isolation material ISM1 may be present among the pixels 110-1 through 110-4 illustrated in FIG. 1A. The first isolation material ISM1 and the second isolation material ISM2 may be the same as or different from each other.

The first and second isolation materials ISM1 and ISM2 may be formed in a process for manufacturing a BSI CMOS image sensor, a FSI CMOS image sensor, and/or other type of image sensor. The first and second isolation materials ISM1 and ISM2 may be formed using DTI, but the inventive concepts are not restricted to the current example embodiments.

Referring to FIGS. 1A, 1B, and 3B, a first pixel 110-1D may include four photodiodes PD1 through PD4, the color filters CF1 through CF4 respectively placed on the four photodiodes PD1 through PD4, the microlenses ML1 through ML4 respectively placed on the color filters CF1 through CF4, and the microlens 111-3A placed on the microlenses ML1 through ML4. The color filters CF1 through CF4 may include a plurality of color filter layers. The color filter layers may have different filtering characteristics. In other words, wavelengths transmitted by the respective color filter layers may be different from each other.

Although the first pixel 110-1 is illustrated as the red pixel R in FIG. 1B, the first pixel 110-1D illustrated in FIG. 3B may be a yellow pixel, a cyan pixel, a magenta pixel, a white pixel, a green pixel, a blue pixel, an infrared pixel, etc., but the inventive concepts are not restricted to these example embodiments. When the first pixel 110-1D is the first pixel 110-1, the color filters CF1 through CF4 may be red filters according to at least one example embodiment. The color filters CF1 through CF4 may be different color filters in other example embodiments.

A second pixel 110-2D may include four photodiodes PD1 through PD4, the color filters CF1 through CF4 respectively placed on the four photodiodes PD1 through PD4, the microlenses ML1 through ML4 respectively placed on the color filters CF1 through CF4, and the microlens 111-3B placed on the microlenses ML1 through ML4. The color filters CF1 through CF4 may include a plurality of color filter layers. The color filter layers may have different filtering characteristics. In other words, wavelengths transmitted by the respective color filter layers may be different from each other.

Although the second pixel 110-2 is illustrated as the green pixel G in FIG. 1B, the second pixel 110-2D illustrated in FIG. 3B may be a yellow pixel, a cyan pixel, a magenta pixel, a white pixel, a red pixel, a blue pixel, an infrared pixel, etc., but the inventive concepts are not restricted to these example embodiments. When the second pixel 110-2D is the second pixel 110-2, the color filters CF1 through CF4 may be green filters according to at least one example embodiment. The color filters CF1 through CF4 may be different color filters in other example embodiments.

Figure 4A:
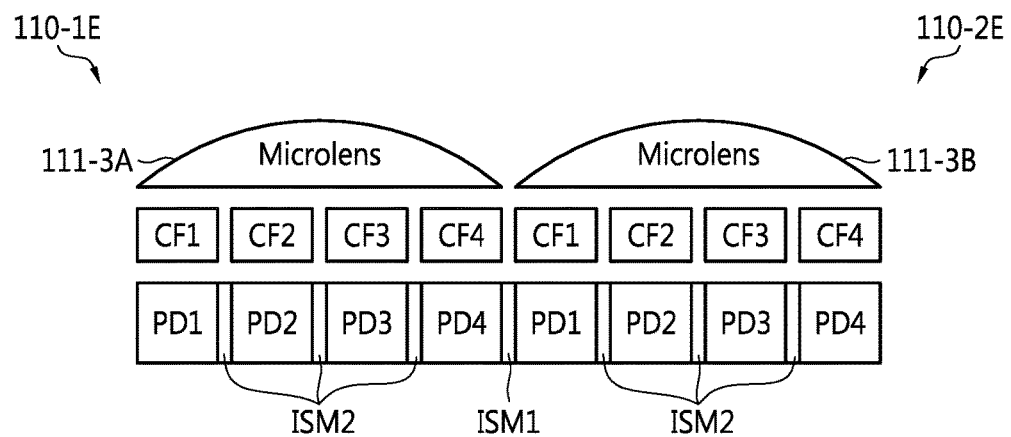
FIGS. 4A and 4B are cross-sectional views of pixels, take along the line II-II illustrated in FIG. 1, according to further example embodiments of the inventive concepts.
Figure 4B:
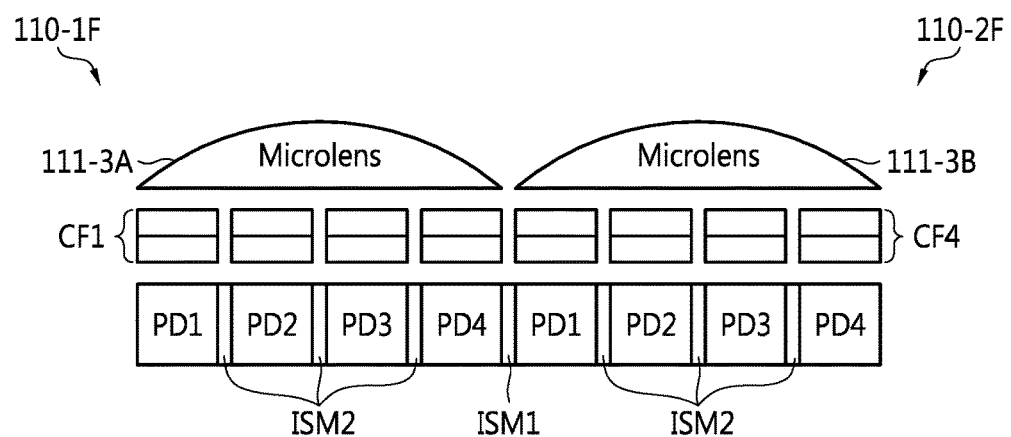

FIGS. 4A and 4B are cross-sectional views of pixels, taken along the line II-II illustrated in FIG. 1, according to further example embodiments of the inventive concepts. Referring to FIG. 4A, a first pixel 110-1E may include four photodiodes PD1 through PD4, the color filters CF1 through CF4 respectively placed on the four photodiodes PD1 through PD4, and the microlens 111-3A placed on the color filters CF1 through CF4. Referring to FIGS. 3A and 4A, the structure of the first pixel 110-1C illustrated in FIG. 3A is the same, or similar, to that of the first pixel 110-1E illustrated in FIG. 4A, except for the microlenses ML1 through ML4.

A second pixel 110-2E may include four photodiodes PD1 through PD4, the color filters CF1 through CF4 respectively placed on the four photodiodes PD1 through PD4, and the microlens 111-3B placed on the color filters CF1 through CF4. Referring to FIGS. 3A and 4A, the structure of the second pixel 110-2C illustrated in FIG. 3A is the same, or similar to, that of the second pixel 110-2E illustrated in FIG. 4A, except for the microlenses ML1 through ML4.

Referring to FIG. 4B, a first pixel 110-1F may include four photodiodes PD1 through PD4, the color filters CF1 through CF4 respectively placed on the four photodiodes PD1 through PD4, and the microlens 111-3A placed on the color filters CF1 through CF4. Each of the color filters CF1 through CF4 may include a plurality of color filter layers. Referring to FIGS. 3B and 4B, the structure of the first pixel 110-1D illustrated in FIG. 3B is the same, or similar to, that of the first pixel 110-1F illustrated in FIG. 4B, except for the microlenses ML1 through ML4.

A second pixel 110-2F may include four photodiodes PD1 through PD4, the color filters CF1 through CF4 respectively placed on the four photodiodes PD1 through PD4, and the microlens 111-313 placed on the color filters CF1 through CF4. Each of the color filters CF1 through CF4 may include a plurality of color filter layers. Referring to FIGS. 3B and 4B, the structure of the second pixel 110-2D illustrated in FIG. 3B is the same, or similar to, that of the second pixel 110-2F illustrated in FIG. 4B, except for the microlenses ML1 through ML4.

Figure 5:
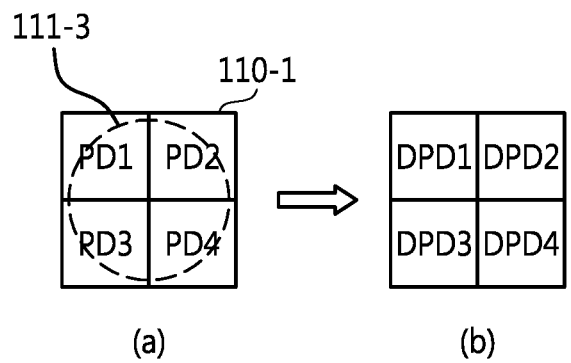
FIG. 5 is a conceptual diagram of a method of computing a disparity using image data corresponding to pixel signals output from a pixel including photoelectric conversion elements according to some example embodiments of the inventive concepts.

FIG. 5 is a conceptual diagram of a method of computing disparity values using image data corresponding to pixel signals output from a pixel including photoelectric conversion elements according to some example embodiments of the inventive concepts. Part (a) of FIG. 5 shows the first pixel 110-1 including the photodiodes PD1 through PD4 and part (b) of FIG. 5 shows image data DPD1 through DPD4 corresponding to pixel signals output from the photodiodes PD1 through PD4, respectively. First image data DATA1 illustrated in FIG. 6 may include the image data DPD1 through DPD4. Each of the image data DPD1 through DPD4 may be represented with "k" bits, where "k" is 2 or a natural number greater than 2.

Disparity values for the first pixel 110-1 may be computed using various methods. For instance, a disparity extractor 220 illustrated in FIG. 6 may compute the disparity value for the first pixel 110-1 using the image data DPD1 through DPD4. Methods described with reference to FIG. 5 are just examples and the method of calculating the disparity value for the first pixel 110-1 is not restricted to the methods illustrated in FIG. 5.

The disparity extractor 220 may compute the disparity using at least the following methods:
(1) (DPD1−DPD2) or (DPD3−DPD4);
(2) (DPD1−DPD3) or (DPD2−DPD4);
(3) {((DPD1+DPD3)/2)−((DPD2+DPD4)/2)};
(4) {((DPD1+DPD2)/2)−((DPD3+DPD4)/2)};
(5) (DPD1−DPD4) or (DPD2−DPD3); and
(6) at least one combination of (1) through (5).

For instance, when the value of the image datum DPD1 is greater than the value of the image datum DPD2, the disparity value has a positive sign; when the value of the image datum DPD1 is equal to the value of the image datum DPD2, the disparity value is zero; and when the value of the image datum DPD1 is less than the value of the image datum DPD2, the disparity value has a negative sign. However, when the disparity value is computed as (DPD2−DPD1), the sign of the disparity value becomes the opposite of what is described above.

In other words, the disparity extractor 220 may compute the disparity values using the difference between image data respectively corresponding to photoelectric conversion elements adjacent to each other horizontally, vertically, diagonally, and/or other relationship. The disparity extractor 220 illustrated in FIG. 6 may compute the disparity value for each pixel including a plurality of photoelectric conversion elements or may compute the disparity value for m*n pixels at a time, where "m" and "n" are natural numbers equal to or greater than 2 and m=n or m≠n.

FIG. 6 is a block diagram of a data processing system 100 according to some example embodiments of the inventive concepts. Referring to FIGS. 1A through 6, the data processing system 100 may include an imaging device 105, an image signal processor 200, and an application processor 300.

The data processing system 100 may be implemented as an image data processing system, a mobile computing device, and/or any other device capable of performing image processing. The mobile computing device including the imaging device 105 may be a laptop computer, a cellular phone, a smart phone, a tablet personal computer (PC), a personal digital assistant (PDA), an enterprise digital assistant (EDA), a digital still camera, a digital video camera, a mobile internet device (MID), a wearable computer, a smart device, an Internet of Things (IoT) device, an Internet of Everything (IoE) device, a drone, a computing device, etc., but the inventive concepts are not restricted to these example embodiments.

The imaging device 105 may generate the first image data DATA1. The imaging device 105 may include an image sensor 107 including the pixel array 110, a lens 115, and an actuator 120. Although the pixel array 110 includes 2*2 pixels in the example embodiments illustrated in FIG. 6, the example embodiments are not limited thereto, and for example, the pixel array 110 may include multiple arrangements of 2*2 pixels.

Each of the pixels included in the pixel array 110 may include a plurality of photoelectric conversion elements. Each pixel including a plurality of photoelectric conversion elements may have any one of the structures described with reference to FIGS. 2A through 4B. Accordingly, the pixel array 110 may be called a full PAF (phase-detection auto focus or phase-difference auto focus) pixel array.

The image sensor 107 may be an image sensor chip, a CMOS image sensor chip, etc. The image sensor 107 may include a processing circuit 112 which processes pixel signals output from the pixels R, G, and B included in the pixel array 110 and generates the first image data DATA1 corresponding to the pixel signals according to at least one example embodiment, but is not limited thereto.

The lens 115 may focus incident light on the pixel array 110. The lens 115 may be an optical lens. The lens 115 may move in response to a control signal CTRL output from the actuator 120. The actuator 120 may generate the control signal CTRL for changing the position of the lens 115 in response to lens position information LEP output from an auto focus engine 230.

Although the auto focus engine 230 is included in the image signal processor 200 in the example embodiment illustrated in FIG. 6, the auto focus engine 230 may be provided inside the imaging device 105, or outside the image signal processor 200. Since the auto focus engine 210 generates the lens position information LEP, it may function as a lens position information calculator as well.

The image signal processor 200 may include a processing circuit 210, the disparity extractor 220, the auto focus engine 230, a PSF selection circuit 240, a memory 251 storing a PSF table 250, a deconvolution circuit 260, etc. The processing circuit 210 may generate pixel location information PCI of each pixel included in the pixel array 110 from the first image data DATA1 output from the imaging device 105 and/or may extract color information CI form the first image data DATA1. The color information CI may be about at least one signal among red, green, blue, yellow, cyan, magenta, white, infrared, etc., signals.

The first image data DATA1 may include long-exposure image data corresponding to long-exposure pixel signals and short-exposure image data corresponding to short-exposure pixel signals. The first image data DATA1 may be image data corresponding to pixel signals output from at least one of the pixels R, G, and B included in the pixel array 110.

The processing circuit 210 may process the first image data DATA1 and generate second image data DATA2 corresponding to the process result. The processing may be at least one among auto dark level compensation, bad pixel replacement, noise reduction, lens shading compensation, color correction, RGB gamma correction, edge enhancement, hue control, and color suppression.

The disparity extractor 220 may extract a disparity value DISP from the first image data DATA1. The disparity value DISP may be depth information. The disparity extractor 220 may compute the disparity value DISP using at least one of the methods described with reference to FIG. 5.

The auto focus engine 230 may calculate the current position of the lens 115 included in the imaging device 105 and may output the lens position information LEP corresponding to the calculation result. The auto focus engine 230 may calculate the current position of the lens 115 using the lens position information LEP output from the actuator 120 and may output the lens position information LEP corresponding to the calculation result. However, the methods of generating the lens position information LEP is not restricted to the one described above.

The PSF selection circuit 240 may retrieve or read) at least one PSF from among PSFs stored in the PSF table 250 in response to selection information and may transmit the at least one PSF SPSF (i.e., the selected PSF) that has been retrieved or read to the deconvolution circuit 260. The PSFs may be for known patterns. The selection information may include at least two kinds of information among the pixel location information PCI, the color information CI, the disparity value DISP, and the lens position information LEP. The PSFs stored in the PSF table 250 will be described in detail with reference to FIGS. 8, 10, and 12.

The memory 251 may store the PSF table 250. The memory 251 may be formed of volatile or non-volatile memory. The volatile memory may be random access memory (RAM), dynamic RAM (DRAM), or static RAM (SRAM), but is not restricted thereto. The non-volatile memory may be flash memory, such as NAND-type flash memory, but is not restricted thereto.

The deconvolution circuit 260 may estimate original image data using the PSF SPSF output from the PSF selection circuit 240 and the second image data DATA2 output from the processing circuit 210 and may send output image data SRO having a super resolution (and/or enhanced resolution) as the estimation result to the application processor 300. The output image data SRO having the super resolution may have higher resolution than the first or second image data DATA1 or DATA2.

For instance, the deconvolution circuit 260 may generate the output image data SRO having the higher resolution than the first or second image data DATA1 or DATA2 using the following equation:

$$y_k = DB_k x + n_k,$$

where "k" is 1, 2, ..., p, "x" is high-resolution image data, Bk is an optical blur matrix, D is a downsampling matrix, nk is noise of the imaging device 105, and yk is low-resolution image data. For instance, "x" may be an original image captured by the image sensor 107 and yk may be the first or second image data DATA1 or DATA2. Here, the output image data SRO having the super resolution may be the high-resolution image data corresponding to an original scene.

In the above equation, an unknown is "x", and therefore, the deconvolution circuit 260 may invert the above equation to calculate the unknown "x". At this time, the calculated value of the unknown "x" may be the output image data SRO. In other words, the deconvolution circuit 260 may estimate the original image data, and generate the higher resolution output image data SRO, by processing the first or second image data DATA1 or DATA2 to compensate for optical blur, downsampling, and/or noise introduced by the image sensor 107. The application processor 300 may process the output image data SRO generated by the image signal processor 200.

Figure 7A:
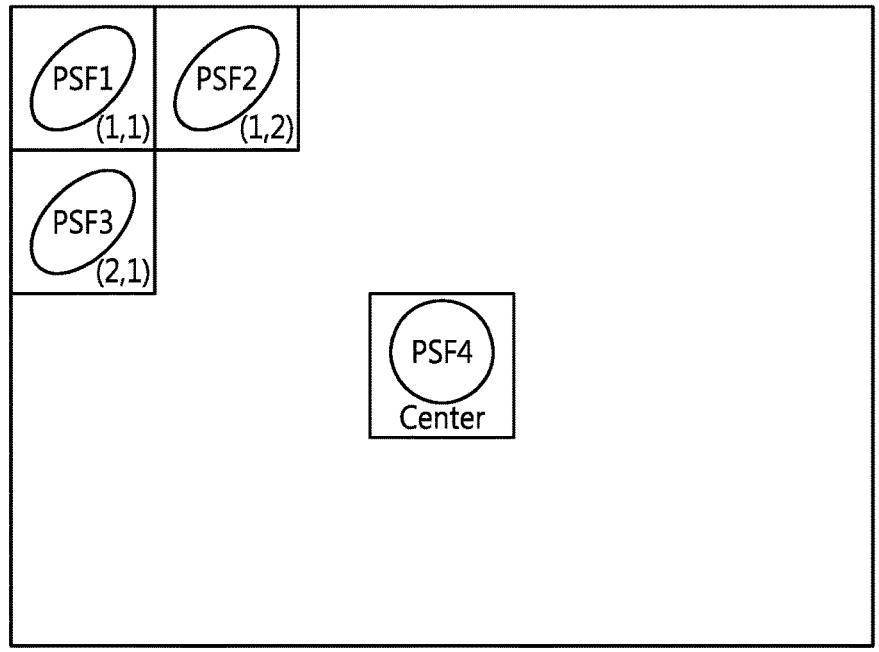
FIGS. 7A and 7B are diagrams of point spread functions (PSFs) with respect to disparity and pixel location according to some example embodiments of the inventive concepts.
Figure 7B:
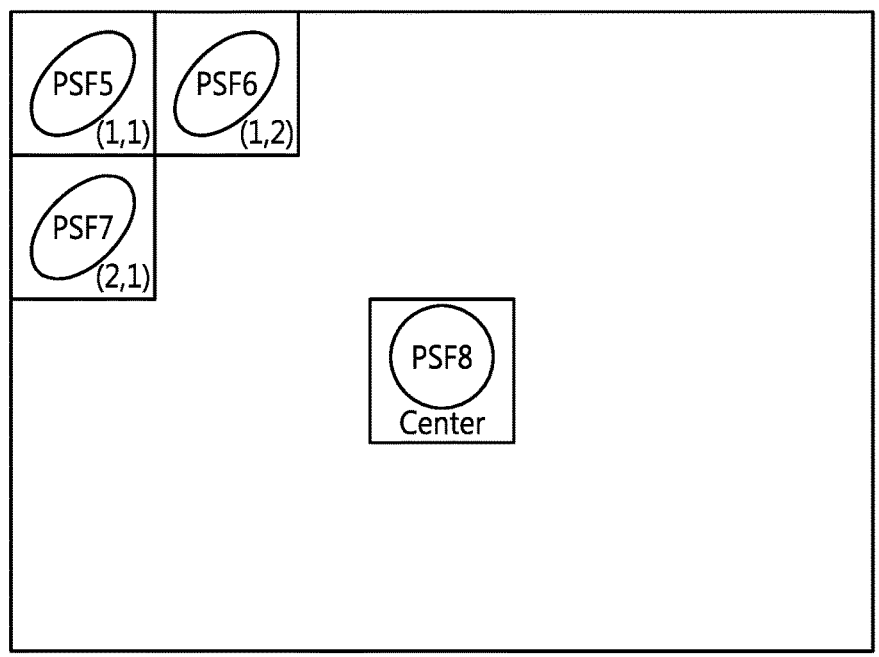

FIGS. 7A and 7B are diagrams of PSFs with respect to disparity values and pixel location according to at least one example embodiment. FIG. 7A illustrates a PSF with respect to the location of each pixel when the disparity value DISP calculated by the disparity extractor 220 is "−1". It is assumed that the PSF of a pixel at a first location (1,1) is PSF1, the PSF of a pixel at a second location (1,2) is PSF2, the PSF of a pixel at a third location (2,1) is PSF3, and the PSF of a pixel at the center is PSF4, etc. Here, the location of a pixel may be the physical location of the pixel in the pixel array 110, the location of image data corresponding to pixel signals output from the pixel, or a location at which the image data is displayed.

FIG. 7B shows a PSF with respect to the location of each pixel when the disparity value DISP calculated by the disparity extractor 220 is "0". It is assumed that the PSF of a pixel at a first location (1,1) is PSF5, the PSF of a pixel at a second location (1,2) is PSF6, the PSF of a pixel at a third location (2,1) is PSF7, and the PSF of a pixel at the center is PSF8.

Figures 8, 9:
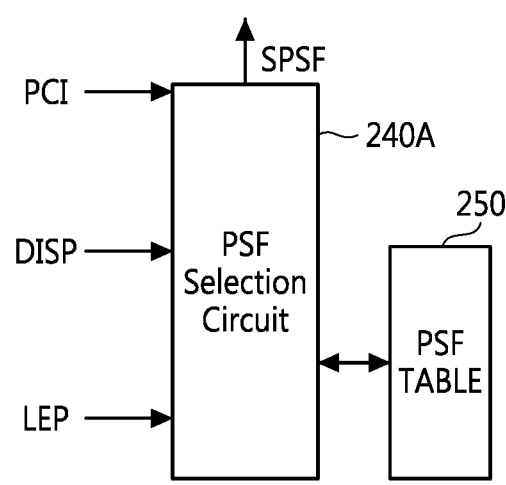
FIG. 8 is a diagram of PSFs stored in a PSF table illustrated in FIG. 6 according to some example embodiments of the inventive concepts.
FIG. 9 is a diagram of input signals of a PSF selection circuit illustrated in FIG. 6 according to some example embodiments of the inventive concepts.

FIG. 8 is a diagram of PSFs stored in the PSF table 250 illustrated in FIG. 6 according to some example embodiments of the inventive concepts. Referring to FIG. 8, the PSF table includes different calculated PSFs based on a pixel location and a disparity. The PSF table including PSFs may be stored in the memory 251 before and/or during the operation of the image signal processor 200.

For instance, when the processing circuit 210 generates the pixel location information PCI corresponding to the first location (1,1) and the disparity extractor 220 generates the disparity value DISP corresponding to a value of "−1", the PSF selection circuit 240 may select PSF1 from among the PSFs stored in the PSF table 250 and may output the selected PSF SPSF (=PSF1) to the deconvolution circuit 260. The deconvolution circuit 260 may generate the output image data SRO having a higher resolution than the second image data DATA2 using the selected PSF SPSF (=PSF1) and the second image data DATA2.

When the processing circuit 210 generates the pixel location information PCI corresponding to the center and the disparity extractor 220 generates the disparity value DISP corresponding to a value of "0", the PSF selection circuit 240 may select PSF8 from among the PSFs stored in the PSF table 250 and may output the selected PSF SPSF (=PSF8) to the deconvolution circuit 260. The deconvolution circuit 260 may generate the output image data SRO having a higher resolution than the second image data DATA2 using the selected PSF SPSF (=PSF8) and the second image data DATA2.

FIG. 9 is a diagram of input signals of the PSF selection circuit 240 illustrated in FIG. 6 according to some example embodiments of the inventive concepts. A PSF selection circuit 240A illustrated in FIG. 9 may select at least one PSF from among the PSFs stored in the PSF table 250 using the pixel location information PCI, the disparity DISP, and the lens position information LEP and may output the selected PSF SPSF to the deconvolution circuit 260.

Figure 10:
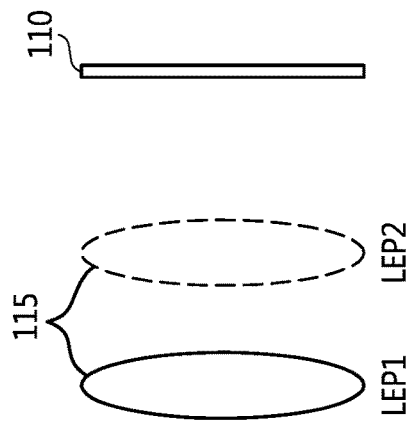
FIG. 10 is a diagram of PSFs stored in a PSF table illustrated in FIG. 9 according to other example embodiments of the inventive concepts.

FIG. 10 is a diagram of PSFs stored in the PSF table 250 illustrated in FIG. 9 according to other example embodiments of the inventive concepts. Referring to FIGS. 6, 9, and 10, when the processing circuit 210 generates the pixel location information PCI corresponding to the first location (1,1), the disparity extractor 220 generates the disparity value DISP corresponding to a value of "−1", and the auto focus engine 230 generates the lens position information LEP corresponding to a first lens position LEP1; the PSF selection circuit 240A may select at least one PSF L1PSF1 from among the PSFs stored in the PSF table 250 and may output the selected PSF SPSF (=L1PSF1) to the deconvolution circuit 260. The deconvolution circuit 260 may generate the output image data SRO having a high resolution using the selected PSF SPSF (=L1PSF1) and the second image data DATA2. The resolution of the output image data SRO may be higher than that of the second image data DATA2.

When the processing circuit 210 generates the pixel location information PCI corresponding to the center, the disparity extractor 220 generates the disparity value DISP corresponding to a value of "+1", and the auto focus engine 230 generates the lens position information LEP corresponding to a second lens position LEP2; the PSF selection circuit 240A may select at least one PSF L2PSF12 from among the PSFs stored in the PSF table 250 and may output the selected PSF SPSF (=L2PSF12) to the deconvolution circuit 260. The deconvolution circuit 260 may generate the output image data SRO having a high resolution using the selected PSF SPSF (=L2PSF12) and the second image data DATA2. The resolution of the output image data SRO may be higher than that of the second image data DATA2.

Figure 11:
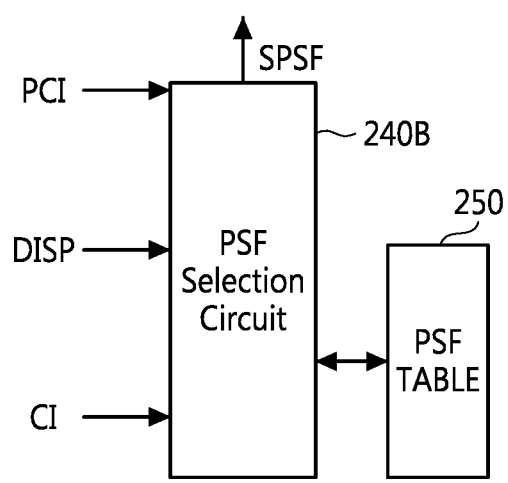
FIG. 11 is a diagram of input signals of the PSF selection circuit illustrated in FIG. 6 according to other example embodiments of the inventive concepts.

FIG. 11 is a diagram of input signals of the PSF selection circuit 240 illustrated in FIG. 6 according to other example embodiments of the inventive concepts. A PSF selection circuit 240B illustrated in FIG. 11 may select at least one PSF from among the PSFs stored in the PSF table 250 using the pixel location information PCI, the disparity value DISP, and the color information CI and may output the selected PST SPSF to the deconvolution circuit 260.

FIG. 12 is a diagram of PSFs stored in the PSF table 250 illustrated in FIG. 11 according to further example embodiments of the inventive concepts. Referring to FIGS. 6, 11, and 12, when the processing circuit 210 generates the pixel location information PCI corresponding to the second location (1,2) and the first color information CI and the disparity extractor 220 generates the disparity value DISP corresponding to a value of "0"; the PSF selection circuit 240B may select at least one PSF C1PSF6 from among the PSFs stored in the PSF table 250 and may output the selected PSF SPSF (=C1PSF6) to the deconvolution circuit 260. The deconvolution circuit 260 may generate the output image data SRO having a high resolution using the selected PST SPSF (=C1PSF6) and the second image data DATA2.

When processing circuit 210 generates the pixel location information PCI corresponding to the third location (2,1) and the second color information CI and the disparity extractor 220 generates the disparity value DISP corresponding to a value of "−1"; the PSF selection circuit 240B may select at least one PSF C2PSF3 from among the PSFs stored in the PSF table 250 and may output the selected PSF SPSF (=C2PSF3) to the deconvolution circuit 260. The deconvolution circuit 260 may generate the output image data SRO having a high resolution using the selected PSF SPSF (=C2PSF3) and the second image data DATA2.

The first color information CI may be information about one signal among the red, green, blue, yellow, cyan, magenta, white, infrared, etc., signals output from pixels. The second color information CI may be information about another signal among the red, green, blue, yellow, cyan, magenta, white, infrared, etc., signals output from pixels. Here, a signal may be data. For instance, the red signal may be red data. The color information CI may be about chromatic aberration or chromatism.

Figure 13:
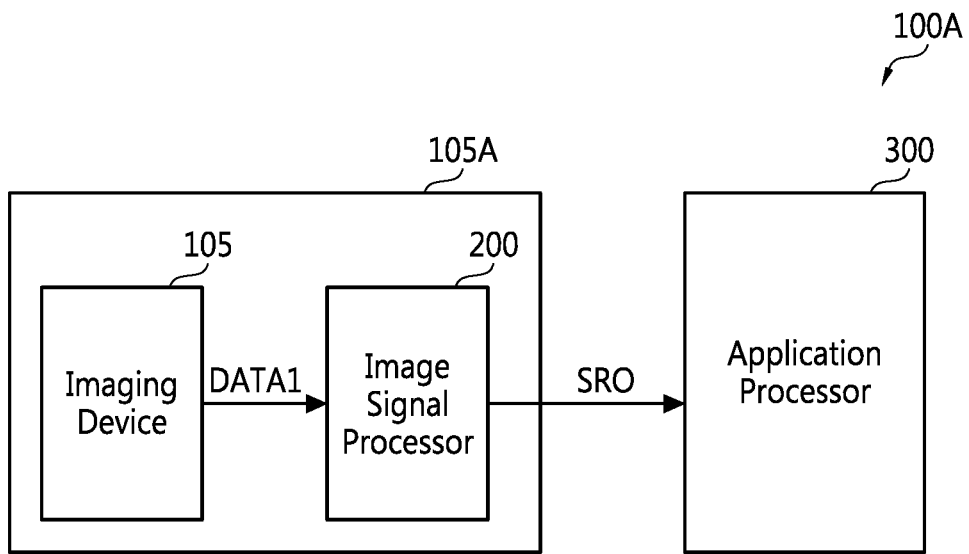
FIG. 13 is a block diagram of a data processing system according to other example embodiments of the inventive concepts.

FIG. 13 is a block diagram of a data processing system 100A according to other example embodiments of the inventive concepts. The data processing system 100A may include a first device 105A and the application processor 300. The first device 105A may include the imaging device 105 and the image signal processor 200.

When the image sensor 107 is implemented in a first semiconductor chip and the image signal processor 200 is implemented in a second semiconductor chip, the image sensor 107 and the image signal processor 200 may be packaged into a single package. The package may be a multi-chip package (MCP), but the inventive concepts are not restricted to this example embodiment. Additionally, the image sensor 107 and the image signal processor 200 may share a single semiconductor substrate.

Figure 14:
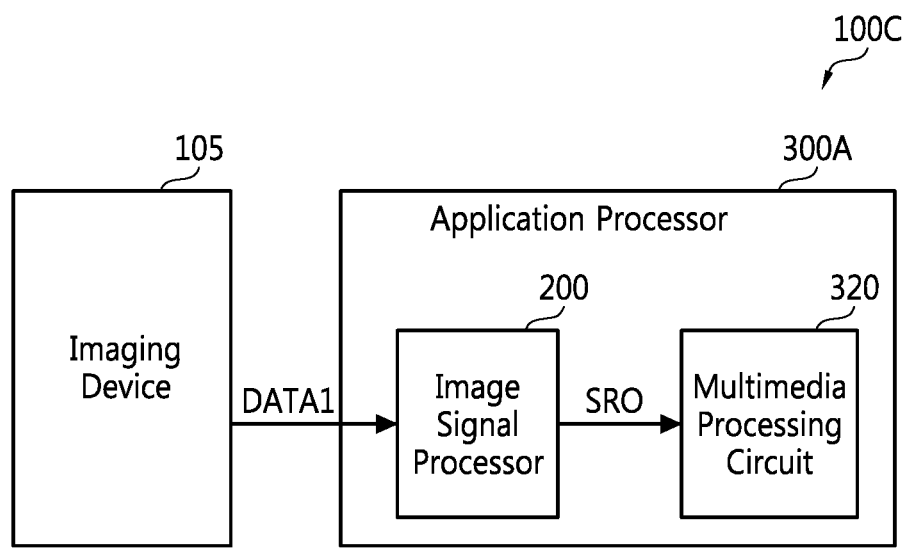
FIG. 14 is a block diagram of a data processing system according to still other example embodiments of the inventive concepts.

FIG. 14 is a block diagram of a data processing system 100C according to still other example embodiments of the inventive concepts. Referring to FIG. 14, the data processing system 100C may include the imaging device 105 and an application processor 300A. The application processor 300A may include the image signal processor 200 and a multimedia processing circuit 320. The multimedia processing circuit 320 may be implemented as a codec, but the inventive concepts are not restricted to this example embodiment. The multimedia processing circuit 320 may process the output image data SRO received from the image signal processor 200.

Figure 15:
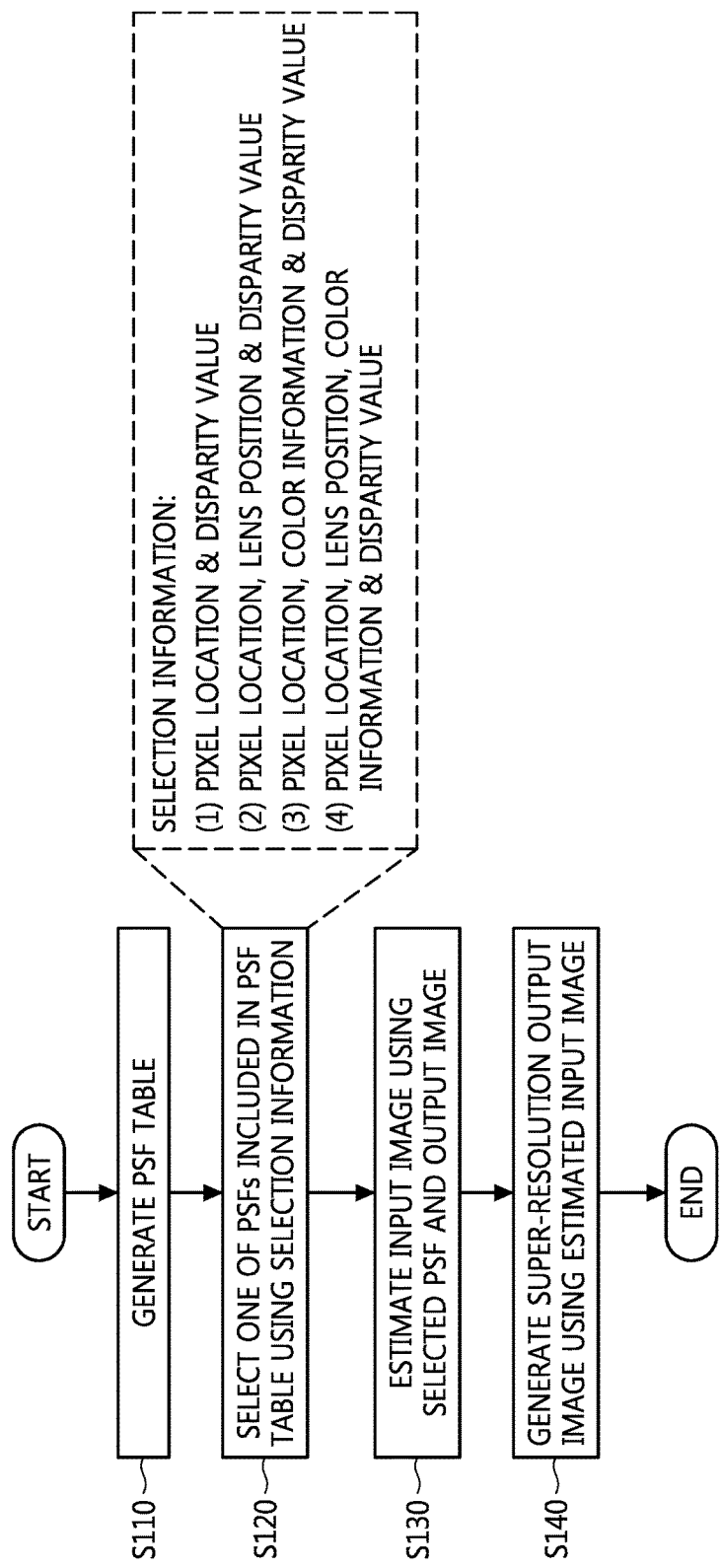
FIG. 15 is a flowchart for explaining the operation of the data processing system illustrated in FIG. 6, 13, or 14 according to some example embodiments of the inventive concepts.

FIG. 15 is a flowchart for explaining the operation of the data processing system 100, 100A, or 100C illustrated in FIG. 6, 13, or 14, according to some example embodiments. Referring to FIGS. 1 through 15, when PSFs are acquired using well-known patterns, the PSFs may be stored in the PSF table 250 illustrated in FIGS. 8, 10, and 12 and the PSF table 250 may be stored in the memory 251 in operation S110.

The image signal processor 200 may select at least one PSF from among PSFs included in the PSF table 250 using selection information in operation S120. The selection information may include at least one kind of information among the pixel location information PCI, the color information CI, the disparity DISP, and the lens position information LEP.

The processing circuit 210 may generate the pixel location information PCI and the color information CI using the first image data DATA1 output from the imaging device 105. The disparity extractor 220 may extract the disparity value DISP from the first image data DATA1 output from the imaging device 105. The auto focus engine 230 may compute the lens position information LEP output to the actuator 120.

The deconvolution circuit 260 may estimate input image data corresponding to an original scene using the selected PSF SPSF output from the PSF selection circuit 240 and the second image data DATA2 output from the processing circuit 210 in operation S130. The deconvolution circuit 260 may generate the output image data SRO having the super resolution using the estimated input image data in operation S140.

Figure 16:
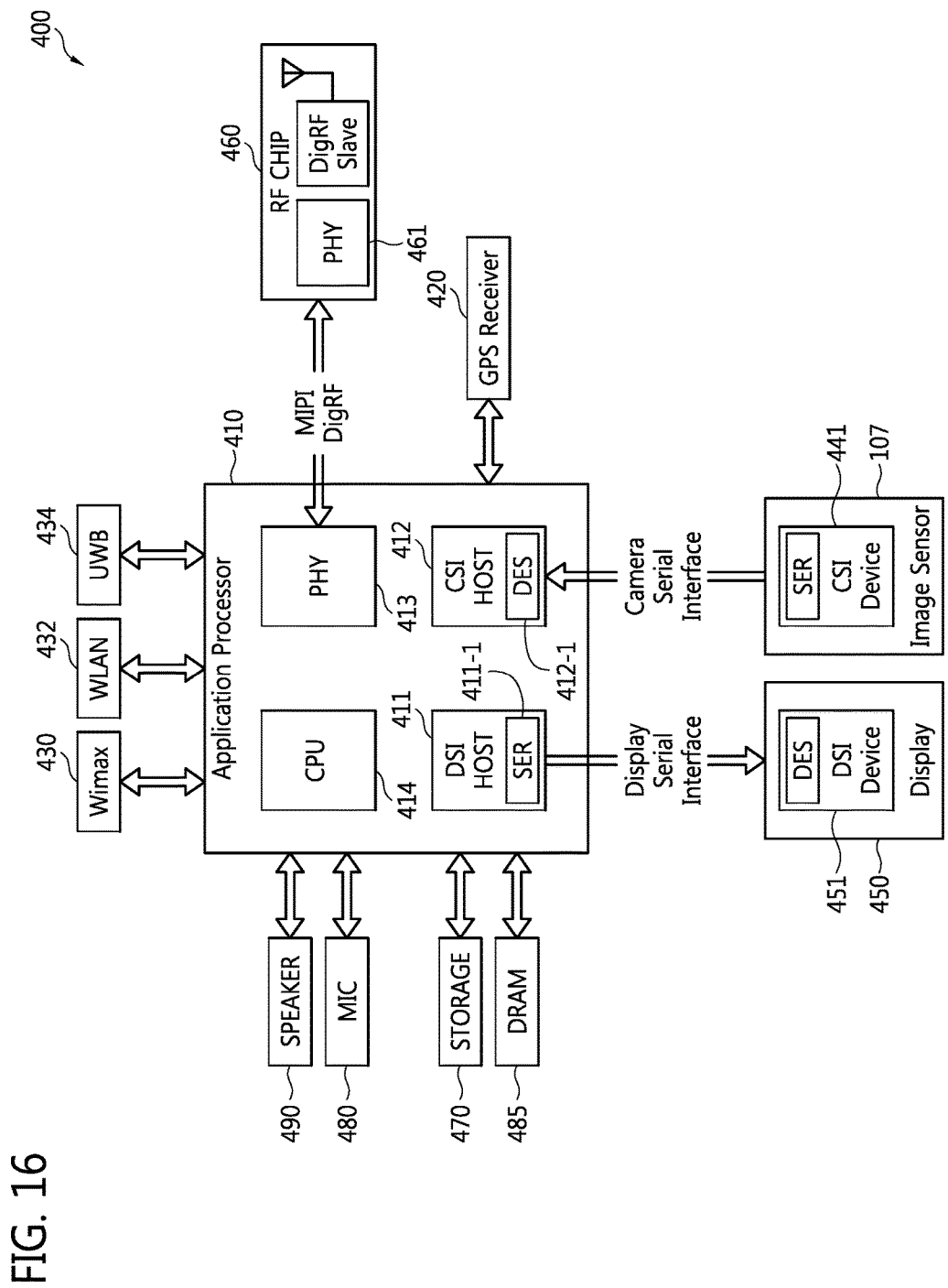
FIG. 16 is a block diagram of a data processing system according to further example embodiments of the inventive concepts.

FIG. 16 is a block diagram of a data processing system 400 according to further example embodiments of the inventive concepts. Referring to FIGS. 1 through 12 and FIG. 16, the data processing system 400 may be implemented as a mobile computing device that can use or support mobile industry processor interface (MIPI®). Referring to FIGS. 6, 13, and 16, the position of the image signal processor 200 may vary with example embodiments. In detail, the image signal processor 200 may be packaged into the same package as the image sensor 107 or an application processor 410 or may be implemented in a separate semiconductor package that connects the imaging device 105 and the application processor 410. The data processing system 400 includes the application processor 410, the image sensor 107, and a display 450.

A camera serial interface (CSI) host 412 in the application processor 410 may perform serial communication with a CSI device 441 in the image sensor 107 through CSI. A deserializer (DES) 412-1 may be included in the CSI host 412 and a serializer (SER) may be included in the CSI device 441. Although the image sensor 107 is illustrated in FIG. 16, the image sensor 107 may be replaced with the imaging device 105 illustrated in FIG. 6 or the first device 105A illustrated in FIG. 13 in other example embodiments. The application processor 410 illustrated in FIG. 16 may also include the image signal processor 200 and the multimedia processing circuit 320, as shown in FIG. 14.

A display serial interface (DSI) host 411 in the application processor 410 may perform serial communication with a DSI device 451 in the display 450 through DSI. A SER 411-1 and a DES may be included in the host 411 and the DSI device 451, respectively. Here, DES and SER may process electrical signals or optical signals.

The data processing system 400 may also include a radio frequency (RF) chip 460 communicating with the application processor 410. A physical layer (PHY) 413 in the application processor 410 and a PHY 461 in the RF chip 460 may communicate data with each other according to MIPI DigRF.

The data processing system 400 may further include a global positioning system (GPS) receiver 420, a memory 485 such as DRAM, a data storage 470 including non-volatile memory such as NAND flash memory, a microphone (MIC) 480, and a speaker 490.

The memory 485 or the data storage 470 and the application processor 410 may be integrated into a single package using the package on package (PoP) or system in package (SiP) technology. At this time, the memory 485 or the data storage 470 may be stacked on the application processor 410.

The data processing system 400 may communicate with external devices using at least one communication protocol or standard, e.g., worldwide interoperability for microwave access (Wimax) 430, wireless local area network (WLAN) 432, ultra-wideband (UWB) 434, or long term evolution (LTE™) (not shown). The data processing system 400 may also communicate with external wireless communication devices using Bluetooth or WiFi.

As described above, according to some example embodiments of the inventive concepts, an image signal processor selects at least one PSF from among a plurality of PSFs included in a table using selection information and generates output image data having a higher resolution than image data using the selected PSF and the image data.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. An image signal processor comprising:
a memory configured to store a table, the table including a plurality of point spread functions (PSFs);
a PSF selection circuit configured to output at least one of the plurality of PSFs stored in the table based on selection information;
a disparity extractor configured to extract a disparity value from image data corresponding to pixel signals output from at least one pixel of a plurality of pixels included in an image sensor, each of the pixels of the image sensor including a plurality of photoelectric conversion elements configured to output the pixel signals;
a processing circuit configured to generate pixel location information for the at least one pixel; and
the selection information includes the disparity value and the pixel location information.

2. The image signal processor of claim 1, wherein the image data comprises:
long-exposure image data corresponding to a first pixel signal output from at least one first photoelectric conversion element among the plurality of photoelectric conversion elements; and
short-exposure image data corresponding to a second pixel signal output from at least one second photoelectric conversion element among the plurality of photoelectric conversion elements.

3. The image signal processor of claim 1, further comprising:
a deconvolution circuit configured to generate output image data having a higher resolution than the image data using the at least one PSF output by the PSF selection circuit and the image data.

4. The image signal processor of claim 1, wherein the image signal processor and the image sensor are included in an imaging device.

5. The image signal processor of claim 1, further comprising:
a lens position information calculator configured to calculate a position of a lens included in an imaging device and generate lens position information, the imaging device including the image sensor;
a deconvolution circuit configured to generate output image data having a higher resolution than the image data using the at least one PSF output by the PSF selection circuit and the image data; and
the selection information further includes the lens position information.

6. The image signal processor of claim 1, further comprising:
a deconvolution circuit configured to generate output image data having a higher resolution than the image data using the at least one PSF output by the PSF selection circuit and the image data;
the processing circuit is configured to extract color information from the image data; and
the selection information further includes the extracted color information.

7. The image signal processor of claim 6, wherein the color information includes at least one signal among a red signal, a green signal, a blue signal, a yellow signal, a cyan signal, a magenta signal, a white signal, and an infrared signal.

8. A data processing system comprising:
an image sensor configured to generate image data, the image sensor including a plurality of pixels, each of the pixels including a plurality of photoelectric conversion elements;
an image signal processor connected to the image sensor; and
an application processor connected to the image signal processor,
the image signal processor comprises,
a memory configured to store a table including a plurality of point spread functions (PSFs);
a PSF selection circuit configured to output at least one of the plurality of PSFs stored in the table based on selection information;
a disparity extractor configured to extract a disparity value from the image data corresponding to pixel signals output from the plurality of photoelectric conversion elements of at least one pixel of the plurality of pixels;
a processing circuit configured to generate pixel location information for the at least one pixel of the plurality of pixels; and
the selection information includes the disparity value and the pixel location information.

9. The data processing system of claim 8, wherein when the image sensor is implemented in a first semiconductor chip and the image signal processor is implemented in a second semiconductor chip, the first semiconductor chip and the second semiconductor chip are included in an imaging device.

10. The data processing system of claim 8, wherein the image signal processor is formed within the application processor.

11. The data processing system of claim 8, wherein the image sensor further comprises:
a plurality of microlenses, each of the plurality of microlenses respectively formed on the plurality of pixels;
at least one first isolation material is disposed among the plurality of pixels; and
at least one second isolation material is disposed among the plurality of photoelectric conversion elements.

12. The data processing system of claim 8, wherein the image signal processor further comprises a deconvolution circuit configured to generate output image data having a higher resolution than the image data using the at least one PSF output by the PSF selection circuit and the image data.

13. The data processing system of claim 8, wherein the data processing system is one selected from at least one of a digital signal lens reflex (DSLR) camera, a smart phone, a tablet device, a wearable device, a laptop computer, an Internet of Things (IoT) device, and an Internet of Everything (IoE) device.

14. The data processing system of claim 8, wherein the image signal processor further comprises:
a deconvolution circuit configured to generate output image data having a higher resolution than the image data using the at least one PSF output by the PSF selection circuit and the image data;
the processing circuit is configured to extract color information from the image data; and
the selection information further includes the extracted color information.

15. The data processing system of claim 8, wherein the image signal processor further comprises:
a lens position information calculator configured to calculate a position of a lens included in an imaging device and generate lens position information, the imaging device including the image sensor;

a deconvolution circuit configured to generate output image data having a higher resolution than the image data using the at least one PSF output by the PSF selection circuit and the image data; and the selection information further includes the lens position information.

16. An image processing system comprising:

an image sensor configured to generate first image data, the image sensor including a plurality of pixels and a lens, and each of the pixels including a plurality of photoelectric conversion elements configured to output pixel signals associated with the first image data; and at least one image signal processor configured to receive the first image data,
    extract a disparity value from the first image data corresponding to the pixel signals output from the plurality of photoelectric conversion elements of the plurality of pixels, and
    generate an output image data by estimating original image data based on the first image data, the output image data having a higher resolution than the first image data.

17. The image processing system of claim 16, wherein the at least one image signal processor is further configured to:

perform processing on the first image data, the processing including at least one of auto dark level compensation, bad pixel replacement, noise reduction, lens shading compensation, color correction, RGB gamma correction, edge enhancement, hue control, and color suppression; and generate a second image data based on results of the processing.

18. The image processing system of claim 17, wherein the estimating includes:

processing the first image data or second image data to compensate for optical blur, downsampling, and noise.

19. The image processing system of claim 18, wherein the at least one image signal processor is further configured to:

calculate at least two of a disparity value, pixel location information, lens position information, and color information of the first image data;

select at least one point spread function (PSF) based on results of the calculation; and apply the selected at least one PSF to the first image in order to compensate for the optical blur, the downsampling, and the noise.

20. The image processing system of claim 19, wherein the image sensor further comprises:

a plurality of microlenses, each of the plurality of microlenses respectively formed on the plurality of pixels;

at least one first isolation material is disposed among the plurality of pixels; and at least one second isolation material is disposed among the plurality of photoelectric conversion elements.

* * * * *